Feb. 22, 1955 M. G. H. GIRODIN 2,702,483
MECHANISM FOR CONVERTING RECIPROCATING
INTO ROTARY MOTION AND VICE-VERSA
Filed Jan. 10, 1950 2 Sheets-Sheet 1
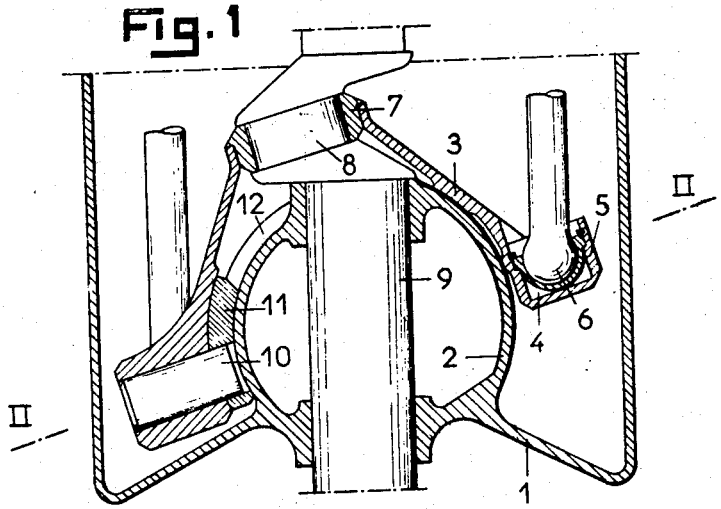
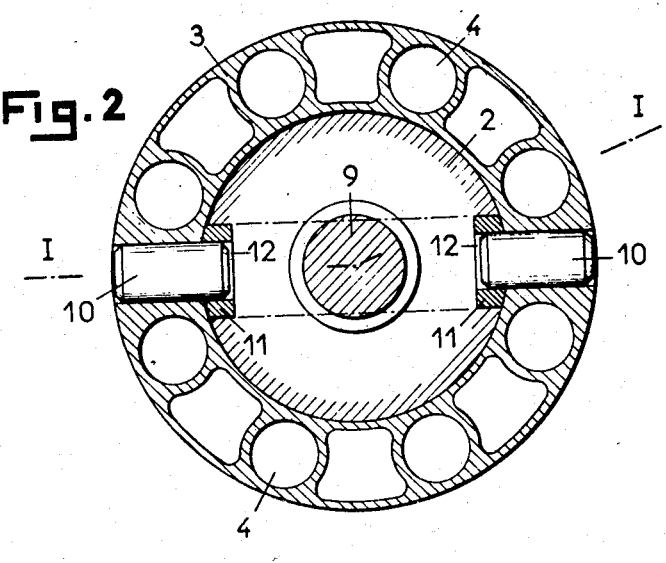
INVENTOR:
Marius Georges Henri Girodin
BY Richard Emry
Ag't INVENTOR.
Marius Georges Henri Girodin United States Patent Office 2,702,483
Patented Feb. 22, 1955

2,702,483

MECHANISM FOR CONVERTING RECIPROCATING INTO ROTARY MOTION AND VICE VERSA

Marius Georges Henri Girodin, Paris, France

Application January 10, 1950, Serial No. 137,795

Claims priority, application France January 10, 1949

4 Claims. (Cl. 74—60)

This invention relates to a mechanism for converting reciprocating movement of pistons into rotary motion of a shaft and vice versa, said mechanism to be used for machines of the type wherein a plurality of cylinders are arranged in substantially parallel relation around a crank shaft, and wherein the pistons are articulated through rods on the periphery of a swivel member which due to its wabbling motion imparts rotary motion to the shaft or receives rotary motion from said shaft and wherein the swivel member is supported by a spheroidal bearing.

The present invention has for its objects improvements in or relating to mechanisms of the aforesaid type and more particularly improvements in or relating to the support of the swivel member.

According to the present invention, the swivel member has a spheroidal bearing surface.

The said swivel member is advantageously connected with the shaft at a suitable distance from the center of the spheroidal bearing through a bearing supporting a crankpin of the shaft.

The swivel member carries at least one trunnion the axis of which passes through the center of the spheroidal bearing or two trunnions in opposite relationship with respect to said center. These trunnions are guided in slideways in a stationary part of the mechanism.

Still other and ancillary objects and features of the improved structure will be apparent from the following description of the invention, of which the accompanying drawings illustrate by way of example two embodiments.

Fig. 1 is a cross-section taken in the plane of line I—I of Fig. 2, illustrating one of the embodiments;

Fig. 2 is a cross-section taken in the plane of line II—II of Fig. 1;

Figure 3:
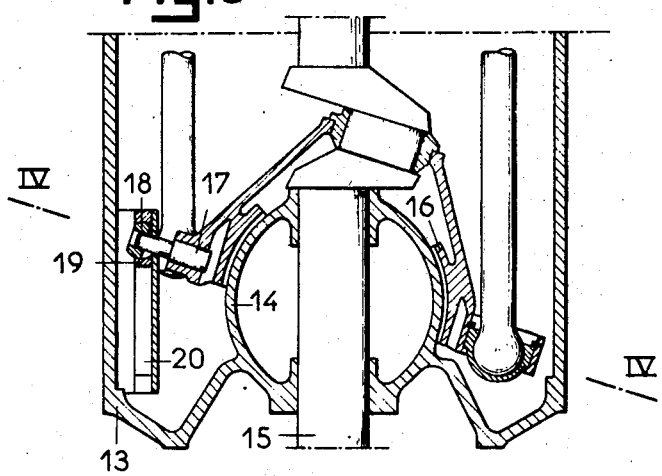
Fig. 3 is a cross-section taken in the plane of line III—III of Fig. 4, illustrating a modified mechanism.

Referring to Figs. 1 and 2, the bottom of the casing 1 carries integrally therewith a spheroidal member 2 that serves as a bearing and as a centering means for the swivel member 3 provided at its periphery with recesses 4. These recesses receive bearing faces 5 for a rolling contact with the ends 6 of pistons or connecting rods. The member 3 supports the bearing 7 for the rotatably arranged oblique crankpin 8 which forms a crank of the shaft 9.

The swivel member 3 carries diametrically opposed trunnions 10 that are rotatably received in shoes 11 that slide cylindrically in the grooves or slideways 12 of the spheroidal bearing 2.

When the shaft 9 rotates, the center of the crankpin 8 describes a circle round the axis of the shaft, while the plane of the ball-shaped rod ends 6 always remains perpendicular to the axis of the crankpin, which latter axis is also that of the swivel member 3, the latter being held fast against rotation by the system 10—11—12. The angular setting of the plane of the balls 6 varies with the rotation of the shaft 9, which results in a longitudinal displacement of the connecting rods and pistons.

Conversely, the movement of the pistons parallel to the shaft 9 produces a rotation of the latter.

Figure 4:
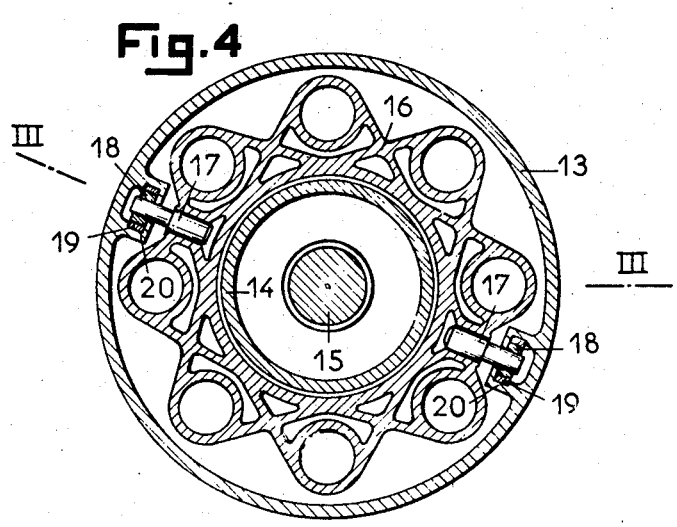
Fig. 4 is a cross-section taken in the plane of line IV—IV of Fig. 3.

In Figs. 3 and 4 the casing 13 forms the bearing 14 through which passes the shaft 15. The swivel member 16 functions as has been explained with respect to the member 3 in Figs. 1 and 2. The diametrically opposed trunnions 17 are formed with heads 18 designed for a rolling contact with shoes 19. The latter slide in grooves or slideways 20 provided in the casing 13.

The operation of the mechanism is the same as in the case of Figs. 1 and 2, with the difference that the guiding effect is obtained through the system 17, 18, 19, 20 forming an outer rectilinear slideway instead of by the system 10, 11, 12 forming an inner circular slideway.

What I claim is:

1. In a mechanism of the character described, a casing for said mechanism, said casing having closely associated therewith an interior spheroidal bearing, a crankshaft extending into the casing and passing through the bearing, said shaft carrying at its end within the casing a crankpin obliquely arranged with respect to the shaft, a swivel member pivotally carried by the crankpin and provided with a spheroidal bearing surface to bear upon said bearing, reciprocatory pistons, piston rods, the free ends of the piston rods being connected with the swivel member, the piston rods being arranged relative to the swivel member so that the thrusts of the power strokes of the pistons are received by the bearing, the swivel member being thus supported by the bearing to transmit the impulses of the power strokes of the pistons to the casing, the swivel member receiving its wabbling movement from the crankpin, and cooperating guide means to prevent the rotation of the swivel member relative to said bearing only in one direction around the axis of the crankpin, said guide means including at least a single trunnion carried in the swivel member, and at least one slideway in a stationary part of the mechanism, said slideway guidingly receiving the trunnion.

2. In a mechanism of the character described, a casing for said mechanism, said casing having integrally formed therewith an interior spheroidal bearing, a crankshaft extending into the casing and passing through the bearing, said shaft carrying at its end within the casing a crankpin obliquely arranged with respect to the shaft, a swivel member pivotally carried by the crankpin and provided with a spheroidal bearing surface to bear upon said bearing, reciprocatory pistons, piston rods, the free ends of the piston rods being connected with the swivel member, the piston rods being arranged relative to the swivel member so that the thrusts of the power strokes of the pistons are received by the bearing, the swivel member being thus supported by the bearing to transmit the impulses of the power strokes of the pistons to the casing, the swivel member receiving its wabbling movement from the crankpin, and cooperating guide means on said swivel member and bearing to prevent the rotation of the swivel member relative to said bearing only in the direction around the axis of the crankpin.

3. The mechanism according to claim 2, wherein said guide means include at least a single trunnion having its axis extending through the center of the spheroidal bearing and carried in the swivel member, and at least one slideway in the bearing in a plane passing through the axis of said crankshaft, the trunnion slidingly received in the slideway.

4. The mechanism according to claim 1 wherein the axis of said single trunnion extends through the center of the spheroidal bearing, and the slideway is located in the casing.

References Cited in the file of this patent

UNITED STATES PATENTS

| | | |
|---|---|---|
| 1,194,258 | Walker | Aug. 8, 1916 |
| 1,331,035 | Soemer | Feb. 17, 1920 |
| 1,885,323 | Duryea | Nov. 1, 1932 |
| 2,104,391 | Redrup | Jan. 4, 1938 |
| 2,263,561 | Biermann | Nov. 25, 1941 |